US010739601B2

(12) United States Patent
Yonekubo et al.

(10) Patent No.: US 10,739,601 B2
(45) Date of Patent: Aug. 11, 2020

(54) IMAGE DISPLAY DEVICE HAVING MAXIMUM EMISSION ANGLE OF FIRST IMAGE LIGHT SMALLER THAN MAXIMUM VIEWING ANGLE OF VIRTUAL IMAGE

(71) Applicant: SEIKO EPSON CORPORATION, Tokyo (JP)

(72) Inventors: Masatoshi Yonekubo, Hara-mura (JP); Osamu Yokoyama, Shiojiri (JP); Takashi Takeda, Suwa (JP); Mitsutaka Ide, Suwa (JP); Daisuke Ishida, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 442 days.

(21) Appl. No.: 15/557,064

(22) PCT Filed: Feb. 1, 2016

(86) PCT No.: PCT/JP2016/000510
§ 371 (c)(1),
(2) Date: Sep. 8, 2017

(87) PCT Pub. No.: WO2016/143246
PCT Pub. Date: Sep. 15, 2016

(65) Prior Publication Data
US 2018/0067325 A1 Mar. 8, 2018

(30) Foreign Application Priority Data
Mar. 9, 2015 (JP) .................................. 2015-045900

(51) Int. Cl.
*G02B 5/18* (2006.01)
*G02B 5/32* (2006.01)
(Continued)

(52) U.S. Cl.
CPC ............ *G02B 27/026* (2013.01); *G02B 5/18* (2013.01); *G02B 5/1814* (2013.01);
(Continued)

(58) Field of Classification Search
CPC ........ G02B 27/0101; G02B 2027/0123; G02B 2027/013; G02B 2027/0145;
(Continued)

(56) References Cited

U.S. PATENT DOCUMENTS 5,436,765 A 7/1995 Togino
5,793,339 A 8/1998 Takahashi
(Continued)

FOREIGN PATENT DOCUMENTS

JP H07-134266 A 5/1995
JP 3155360 B2 4/2001
JP 4635543 B2 2/2011

OTHER PUBLICATIONS

Apr. 26, 2016 International Search Report issued in International Patent Application No. PCT/JP2016/000510.

*Primary Examiner* — Ryan S Dunning
(74) *Attorney, Agent, or Firm* — Oliff PLC

(57) ABSTRACT

The image display device includes an image generating unit that emits first image light, a pupil expanding element that expands a diameter of a light flux included in the first image light from the image generating unit to obtain second image light, a first light condensing optical system that condenses the second image light and forms an intermediate image, and a second light condensing optical system that condenses light from the intermediate image and generates a virtual image on eye of a viewer, in a plane including at least the image generating unit, the pupil expanding element, and the eye of the viewer, a maximum emission angle of the first image light is smaller than a maximum viewing angle of the (Continued)

virtual image, and the diameter of the light flux included in the second image light is greater than that of a light flux included in the virtual image.

16 Claims, 6 Drawing Sheets

(51) Int. Cl.
   *G02B 27/01* (2006.01)
   *G02B 27/02* (2006.01)
   *H04N 5/64* (2006.01)
   *G02B 27/00* (2006.01)

(52) U.S. Cl.
   CPC ............. *G02B 5/1871* (2013.01); *G02B 5/32* (2013.01); *G02B 27/0081* (2013.01); *G02B 27/0101* (2013.01); *G02B 27/017* (2013.01); *G02B 27/0172* (2013.01); *G02B 27/027* (2013.01); *H04N 5/64* (2013.01); *G02B 2027/0107* (2013.01); *G02B 2027/0178* (2013.01)

(58) Field of Classification Search
   CPC .............. G02B 27/017; G02B 27/0172; G02B 2027/0174; G02B 2027/0178; G02B 27/026; G02B 27/027; G02B 27/144
   USPC ...... 348/115; 359/13, 14, 15, 629, 630, 631, 359/633, 641
   See application file for complete search history.

(56) References Cited

U.S. PATENT DOCUMENTS

| | | | |
|---|---|---|---|
| 2007/0171370 A1 | 7/2007 | Watanabe | |
| 2009/0244717 A1* | 10/2009 | Tocci | G02B 5/04 359/636 |
| 2015/0061975 A1* | 3/2015 | Komatsu | G02B 27/0172 345/8 |
| 2015/0260987 A1* | 9/2015 | Weingarten | G02B 27/0101 348/115 |
| 2016/0370582 A1* | 12/2016 | Watanabe | G02B 27/0081 |

* cited by examiner

IMAGE DISPLAY DEVICE HAVING MAXIMUM EMISSION ANGLE OF FIRST IMAGE LIGHT SMALLER THAN MAXIMUM VIEWING ANGLE OF VIRTUAL IMAGE

TECHNICAL FIELD

The present disclosure relates to an image display device.

BACKGROUND ART

In recent, a wearable type display device such as a head mounted display has attracted attention. In such a head mounted display, a diameter of light flux included in image light at the time of being incident on pupils of a viewer, that is, in a case in which an exit pupil is smaller than a diameter of the pupil of the viewer, a position of the pupil of the viewer is required to be adjusted so as not to be deviated from the exit pupil, and thus usability thereof is very deteriorated. Here, a technique for expanding the exit pupil being formed by the image light using an optical element has been known (for example, refer to PTL 1). A function of expanding the exit pupil formed by such an image light is referred to as a pupil expanding function hereinafter.

CITATION LIST

Patent Literature

PTL 1: Japanese Unexamined Patent Application Publication No. 07-134266

SUMMARY OF INVENTION

Technical Problem

However, a head mounted display is further required to have a higher viewing angle (achieving a wider angle). In order to realize a wider angle of the head mounted display, a viewing angle of the image light is required to be greater using an optical system such as a lens or a concave mirror.

However, if a viewing angle of the image light is increased, a size of the exit pupil is reduced. As described above, magnification of the viewing angle and magnification of the pupil has a conflicting relationship. Here, new technique capable of achieving both the pupil expanding function and the viewing angle expanding function is desired to be provided.

The embodiment has been made in view of such a circumstance, and has an object to provide an image display device capable of achieving both the pupil expanding function and the viewing angle expanding function.

Solution to Problem

According to a first aspect, there is provided an image display device of the embodiment including an image generating unit that emits first image light, a pupil expanding element that expands a diameter of a light flux being included in the first image light from the image generating unit so that the magnified light becomes second image light, a first light condensing optical system that condenses the second image light and forms an intermediate image, and a second light condensing optical system that condenses light from the intermediate image and generates a virtual image to eyes of a viewer, in which, in a plane including at least the image generating unit, the pupil expanding element, and the eyes of the viewer, a maximum emission angle of the first image light is smaller than a maximum viewing angle of the virtual image, and the diameter of the light flux being included in the second image light is greater than that of a light flux being included in the virtual image.

A diameter of the light flux included in the virtual image at the time of being incident on the pupil of the viewer, that is, a size of the exit pupil and a magnitude of the viewing angle has a relationship in which the size of the exit pupil is reduced if the viewing angle of the virtual image is magnified.

According to the image display device of the first aspect, the diameter of the light flux included in the second image light is greater than the exit pupil, and thus the magnitude of the light flux (exit pupil) included in the virtual image is set in consideration of the amount of reduction thereof as the viewing angle of the virtual image is magnified. Therefore, even when the diameter of the light flux included in the virtual image is reduced by expanding the viewing angle of the virtual image, a predetermined size of the exit pupil can be obtained. Accordingly, the image display device which achieves both the pupil expanding function and the viewing angle expanding function can be provided.

In the first aspect described above, an angular magnification, which is regulated by the maximum viewing angle of the virtual image with respect to the maximum emission angle of the first image light, may be 1 or more and 2.5 or less. At this time, it is desirable that the angular magnification is 1.1 or more and 1.7 or less.

According to this configuration, increase in size of the pupil expanding element or the first light condensing optical system due to enlarging of the angular magnification more than necessary is prevented, and thus the image display device itself can be miniaturized.

In the first aspect described above, an angular magnification, in which a substantially focal distance of the first light condensing optical system may be divided by a substantial focal distance of the second light condensing optical system, is 1 or more and 2.5 or less. It is desirable that the angular magnification is 1.1 or more and 1.7 or less.

According to this configuration, increase in size of the pupil expanding element or the first light condensing optical system due to enlarging of the angular magnification more than necessary is prevented, and thus the image display device itself can be miniaturized.

In the first aspect described above, the pupil expanding element may set a magnification ratio so that a diameter of the light flux included in the second image light is equal to or greater than a size obtained by multiplying a diameter of the light flux being included in the virtual image by the angular magnification.

According to this configuration, the magnitude of the second image light is set in consideration of the amount of reduction due to higher viewing angle, and thus the image light can be increased more than the predetermined exit pupil.

In the first aspect described above, the image generating unit may be a light scanning device which scans the light emitted from a light source unit so as to set the light as the first image light.

In this way, in a method of forming the image light by the light scanning device, the image display device is provided in which miniaturization and a higher viewing angle are realized by achieving both the pupil expanding function and the viewing angle expanding function.

In the first aspect described above, the image generating unit may include an electro-optical device and a collimator lens.

According to this configuration, in a method of forming the image light by the electro-optical device, the image display device is provided in which miniaturization and a higher viewing angle are realized by achieving both the pupil expanding function and the viewing angle expanding function.

In the first aspect described above, the pupil expanding element may be an optical element in which a plurality of light guiding materials are bonded to each other through a half mirror layer.

According to this configuration, it is possible to easily and surely expand the image light.

In the first aspect described above, the pupil expanding element may be an optical element including a diffraction element.

According to this configuration, it is possible to easily and surely expand the image light.

In the first aspect described above, the first light condensing optical system may be an optical system having at least positive power and negative power, and may totally have the positive power.

According to this configuration, it is possible to clearly provide the intermediate image of the image light.

In the first aspect described above, the second light condensing optical system is a concave mirror having the positive power in a plane including at least the image generating unit, the pupil expanding element, and the eye of the viewer.

According to this configuration, the light emitted from the intermediate image is returned to approximate parallel light, and the exit pupil can be formed near the pupils of the eyes of the viewer. Accordingly, the virtual image of a predetermined viewing angle can be generated in the distance.

In the first aspect described above, the second light condensing optical system is a reflective type hologram having the positive power in the plane including at least the image generating unit, the pupil expanding element, and the eye of the viewer.

Since an incident angle of a reflection angle of a hologram can be made different from each other, an effect of expanding pupil of expanding a section of the reflected light flux can be obtained. Accordingly, the diameter of the light flux included in the second image light can be reduced, as much as the effect of expanding pupil due to the hologram. Accordingly, as much as the diameter of the light flux included in the second image light is reduced, the pupil expanding element and a first or second light condensing optical system can be miniaturized, and thus the entire apparatus can be miniaturized.

In addition, for example, if an original magnitude as the magnitude of the diameter of the light flux included in the second image light is secured, the light flux having a sufficient size included in the virtual image can be obtained due to the effect of expanding pupil of the hologram even when the angular magnification is magnified. Accordingly, it is possible to achieve the higher viewing angle.

Otherwise, if the magnitude of the light flux and the angular magnification included in the second image light are not changed, the light flux included in the virtual image can be more magnified as much as the effect of expanding pupil of the hologram, and thus it is possible to improve visibility for people having various sizes of the eyes.

DESCRIPTION OF EMBODIMENTS

Hereinafter, embodiments will be described in detail with reference to drawings.

Also, there are cases in which a part to be a feature for the sake of convenience in drawings to be used in following description is enlarged and illustrated in order to easily understand features thereof, and a dimensional ratio of each component is not necessary to be the same as that of the actual.

Hereinafter, an embodiment will be described in detail with respect to drawings.

The image display device of the present embodiment is an example of a head mounted display which a user wears on his or her head to use.

In the following description, a head mounted display will be shortened to HMD.

Figure 1:
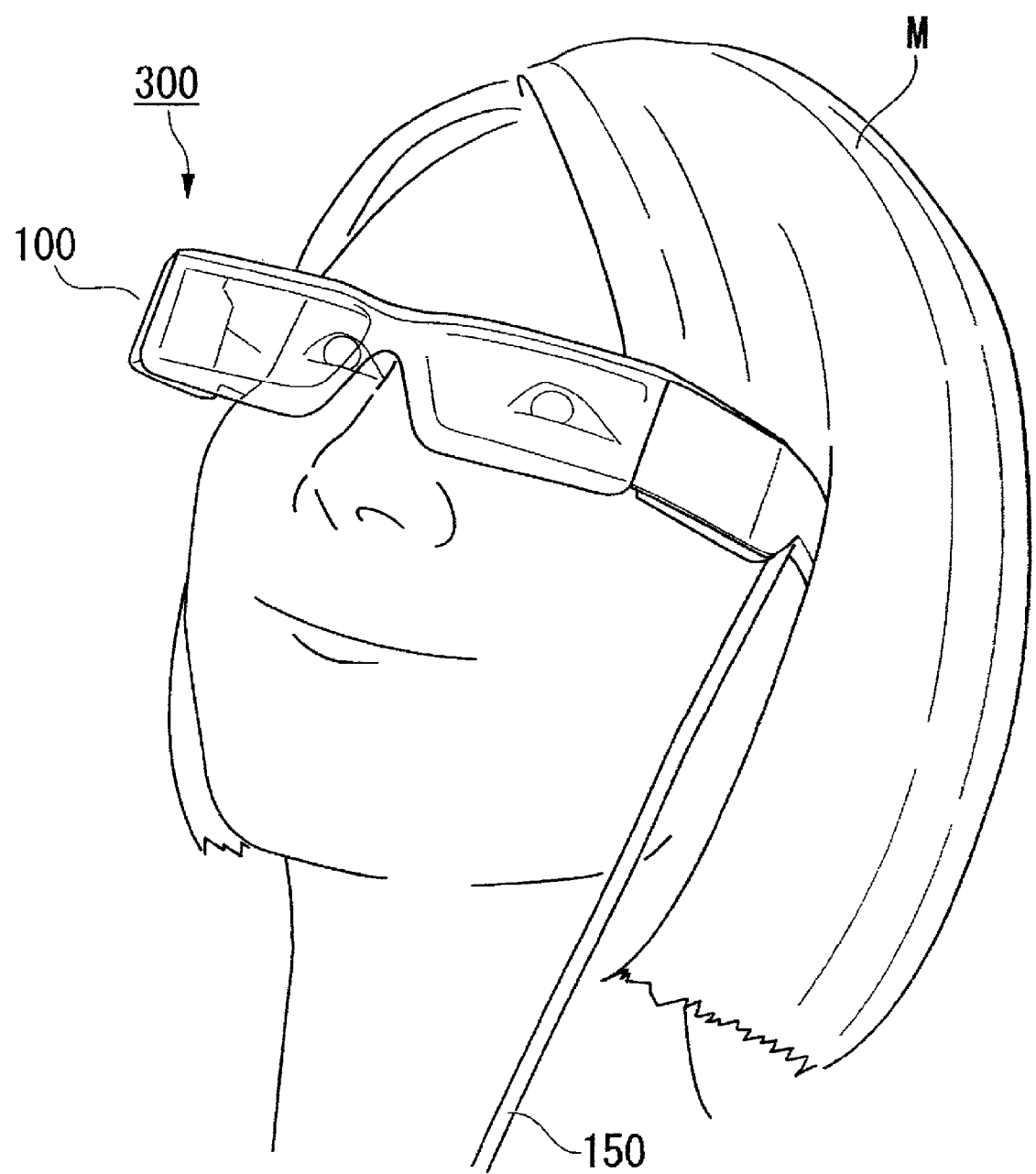
FIG. 1 is a view illustrating a state in which a HMD of the present embodiment is worn.

FIG. 1 is a view illustrating a state in which the user wears the HMD of the present embodiment.

Figure 2:
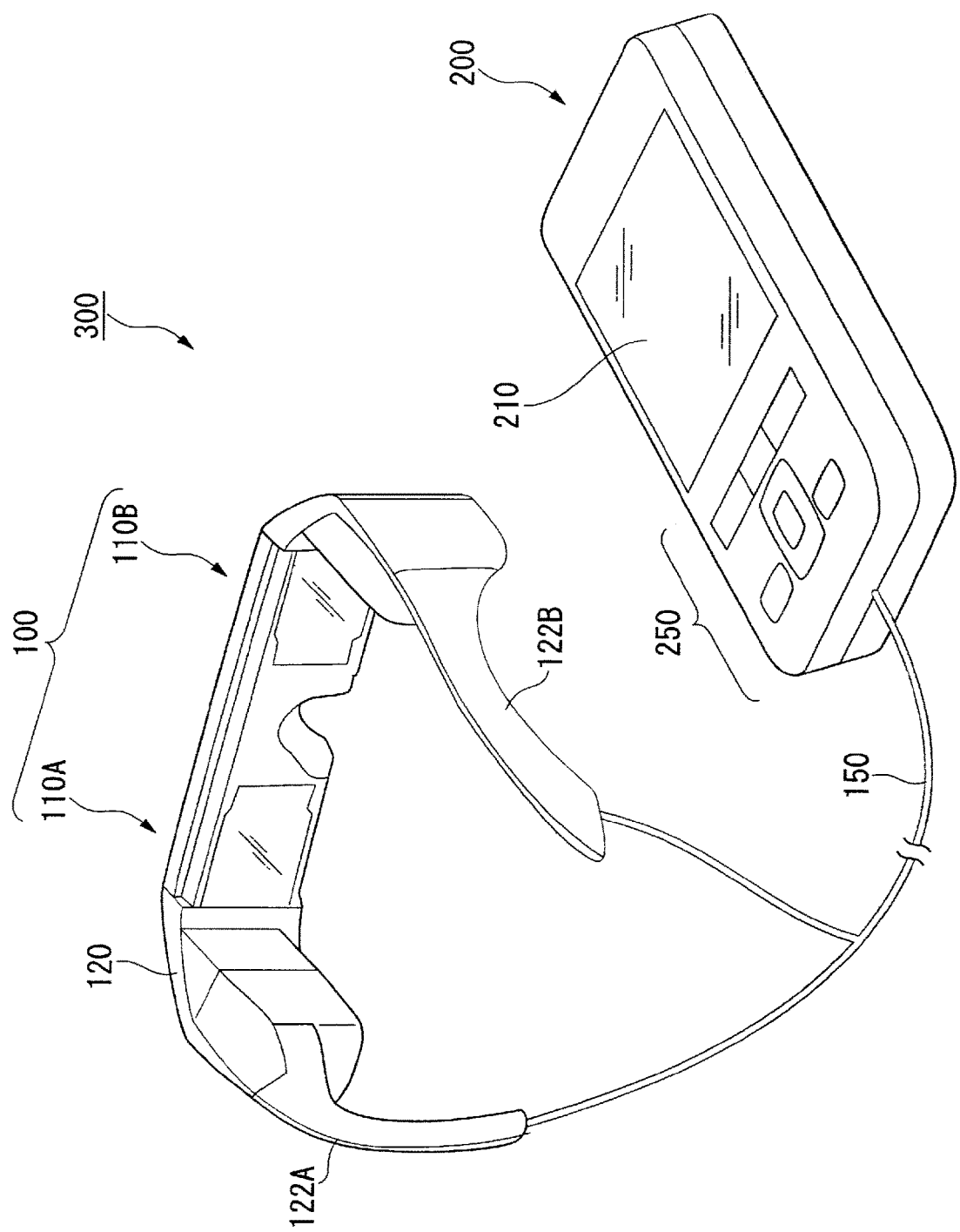
FIG. 2 is a perspective view of the HMD of the present embodiment.

FIG. 2 is a perspective view of the HMD of the present embodiment.

As illustrated in FIG. 1, an HMD 300 of the present embodiment is worn on a head portion and used by the user with the feeling of wearing eyeglasses. The HMD 300 of the present embodiment is a see-through type (transmitting type) HMD. According to the HMD 300 of the present embodiment, the user is capable of visually recognizing an image which is generated by an image display unit, and is also capable of visually recognizing an image of the outdoor scenes such as the scenery which is external to the HMD 300.

As illustrated in FIG. 2, the HMD 300 is provided with a display device 100 which has a shape which is similar to eyeglasses, and a control device (controller) 200 which has a size of a degree a user may hold using a hand of the user. The display device 100 and the control device 200 are connected in a wired or a wireless manner to be capable of communication. In the present embodiment, each of a left eye image display unit 110A and a right eye image display unit 110B which form the display device 100, and the control device 200 are connected in a wired manner via a cable 150 to be capable of communication, and communicate image signals, control signals, and the like.

The display device 100 is provided with a main frame (main body of device) 120, the left eye image display unit 110A, and the right eye image display unit 110B. The control device 200 is provided with a display unit 210, and an operation button unit 250. The display unit 210 displays various information, instructions, and the like to be provided to the user, for example. A main frame 120 is provided with a pair of temple portions 122A and 122B for the user to wear on the ears of the user. The main frame 120 is a member which supports the left eye image display unit 110A and the right eye image display unit 110B.

Figure 3:
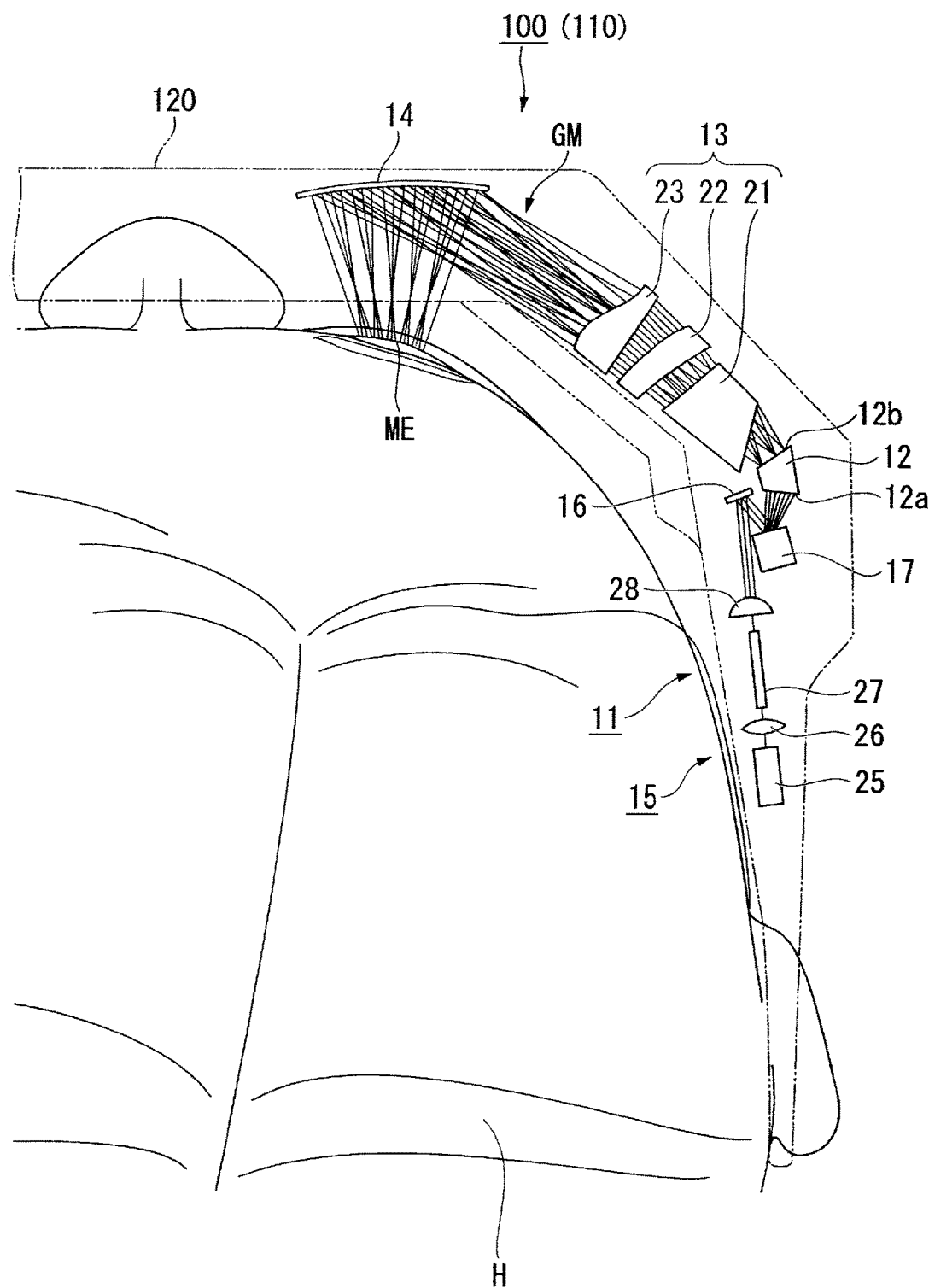
FIG. 3 is a plan view illustrating a configuration of each part of a display device.

FIG. 3 is a plan view illustrating the configuration of the portions of the display device 100. FIG. 3 illustrates a state of the user wearing the display device 100 as viewed from above the head.

The right eye image display unit 110B and the left eye image display unit 110A have the same configuration, and the configuration elements inside both the image display units are disposed to be left-right symmetrical. Therefore, hereinafter, detailed description will be given of the right eye image display unit 110B simply as the image display unit 110, and description of the left eye image display unit 110A will be omitted.

As illustrated in FIG. 3, the image display unit 110 is provided with an image generating unit 11, a pupil expanding element 12, a first light condensing optical system 13, and a second light condensing optical system 14. The image generating unit 11 emits light which includes image information. The pupil expanding element 12 expands a beam diameter of the light which is emitted from a light scanning device 17 to be described later.

The image generating unit 11 is provided with a light source optical system 15, a mirror 16, and the light scanning device 17. The light source optical system 15 emits light which is generated by an internal semiconductor laser. The mirror 16 reflects the light which is emitted from the light source optical system 15 and turns back the optical path of the light. The light scanning device 17 scans the light which is reflected by the mirror 16.

The light source optical system 15 is provided with a light source unit 25, a pickup lens 26, an optical fiber 27, and a collimator lens 28. For example, the light source unit 25 is provided with a plurality of solid state light sources (not illustrated) including a semiconductor laser which emits red light, a semiconductor laser which emits green light, and a semiconductor laser which emits blue light. The colors of light which are emitted from the semiconductor lasers are modulated according to the image signal, the colors of light which are modulated are combined, and are emitted from the light source unit 25 as image light. The pickup lens 26 transmits the light which is emitted from the light source unit 25 to the optical fiber 27 of a later stage. The optical fiber 27 guides the light, which passes from the light source unit 25, through the pickup lens 26, and is incident on the optical fiber 27, to an optical system of a later stage. A collimator lens 28 parallelizes the light which is incident from the optical fiber 27.

The optical path of the light which is emitted from the light source optical system 15 is turned back due to the light being reflected by the mirror 16, and the light is guided to the light scanning device 17. The light scanning device 17 is provided with an MEMS mirror (not illustrated), for example. The light scanning device 17 causes the posture of the MEMS mirror to change in accordance with a modulation operation of the light source optical system 15, and scans light two-dimensionally. In this manner, the light scanning device 17 emits image light which includes image information.

However, recently, the head mounted display is required to have a widened viewing angle in which the viewing angle is more magnified. In addition, since the head mounted display is used in a state of being worn on the head portion of a user, the head mounted display is further required to be miniaturized.

In the HMD 300 of the present embodiment, miniaturization of a device configuration is achieved by generating image light using the light scanning device 17 including the MEMS mirror. Performance of the MEMS mirror has a trade-off relationship in which the diameter of the mirror and an oscillation angle of the mirror are determined and the oscillation angle is reduced if the diameter of the mirror increases. Meanwhile, if the diameter of the mirror is reduced too much in order to realize high resolution, resolution feeling is lowered due to a diffraction phenomenon, and thus it is not possible to unduly reduce the diameter of the mirror and increase the oscillation angle. Generally, regarding a balanced design value of the diameter of the mirror and the oscillation angle of the mirror, the diameter of the mirror is 1 mm, and the oscillation angle is 10 degrees as a half viewing angle of a light beam angle.

The light scanning device 17 of the present embodiment adopts an MEMS mirror in which a diameter is 1 mm and an oscillation angle is 10 degrees as a half viewing angle.

Generally, if a size of a pupil of an eye of a viewer, movement of an eyeball, individual differences of a width of eyes, or the like is considered, it is thought that a size of an exit pupil is required to be approximately 6 mm to 8 mm.

In the HMD 300 of the present embodiment, a diameter of the MEMS mirror is 1 mm, and thus light from the MEMS mirror is magnified up to 6 mm or more by the pupil expanding element 12.

Here, in the head mounted display, in a case of a half viewing angle of the 10 degrees MEMS mirror, it corresponds to a virtual image size of approximately 40 inches 2.5 m ahead and an aspect 16:9. Accordingly, in order to realize the higher viewing angle of which the viewing angle is wide, it is necessary to increase (widen) the viewing angle by an optical system. However, the viewing angle and a size of the exit pupil have a conflicting relationship with each other, and for example, if the viewing angle is magnified, the size of the exit pupil is reduced.

With respect to the above description, the HMD 300 of the present embodiment is capable of achieving both a pupil expanding function and a viewing angle expanding function by adopting a configuration to be described later.

Here, the pupil expanding function in the HMD 300 of the present embodiment will be described. Hereinafter, the main frame 120 (that is, image generating unit 11 and pupil expanding element 12) and a pupil expanding function in a plane including an eye of a viewer M (in-plane illustrated in FIG. 3) will be described.

Figure 4:
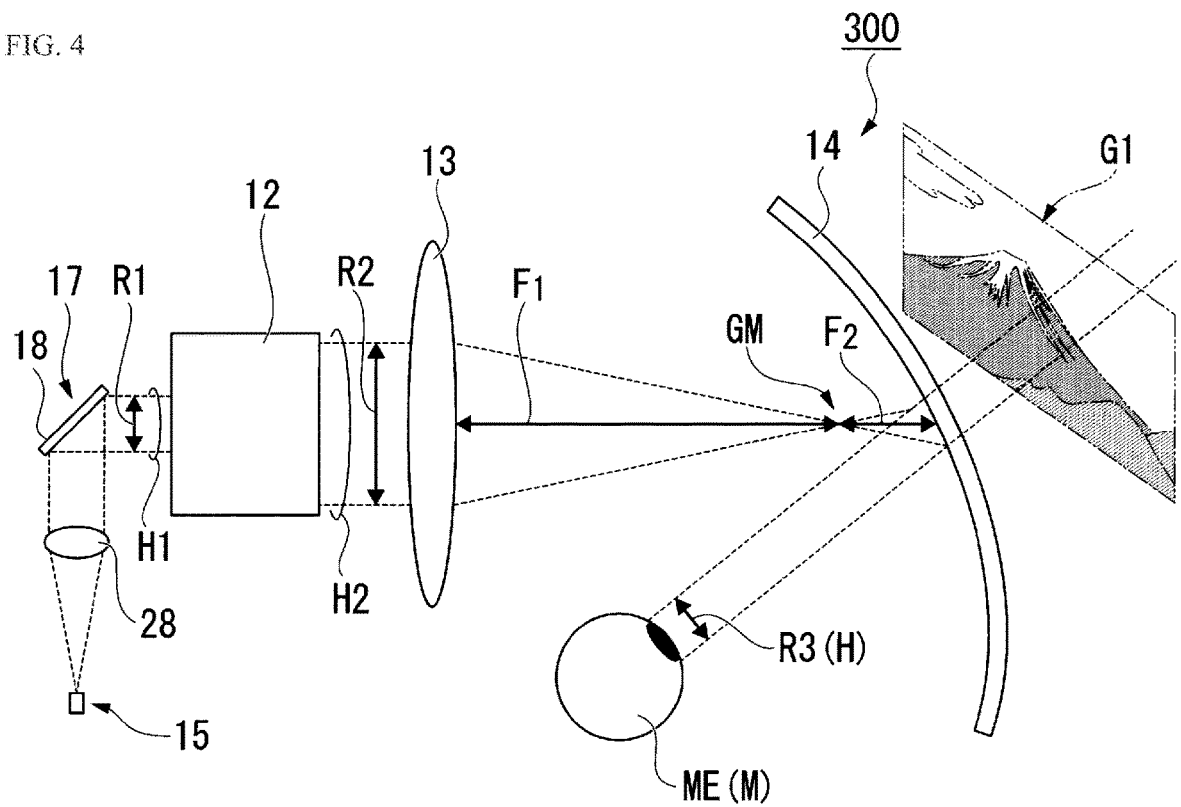
FIG. 4 is a view for describing a pupil expanding function.

FIG. 4 is a view for describing the pupil expanding function. Also, a light flux of the center of an image (virtual image) is only illustrated in FIG. 4. In addition, in FIG. 4, a first light condensing optical system 13 is illustrated as one lens in order to easily see the system.

Here, in FIG. 4, a size of a first image light H1 which is a light emitting portion (corresponding to exit port where image light is emitted) of the MEMS mirror 18 is set to R1, a size of a second image light H2 which is a light emitting portion (corresponding to exit port where magnified image light is emitted) of the pupil expanding element 12 is set to R2, and a diameter of the light flux included in the image light at the time of being incident on the pupil of the viewer M, that is, a size of an exit pupil H is set to R3.

As illustrated in FIG. 4, light emitted from the light source optical system 15 is parallelized by the collimator lens 28 so as to be parallel light. The parallelized light has a changed angle due to the MEMS mirror 18 of the light scanning device 17 so as to constitute the image light. The image light in which the angle is changed due to the MEMS mirror 18 is incident on the pupil expanding element 12.

Figure 5:
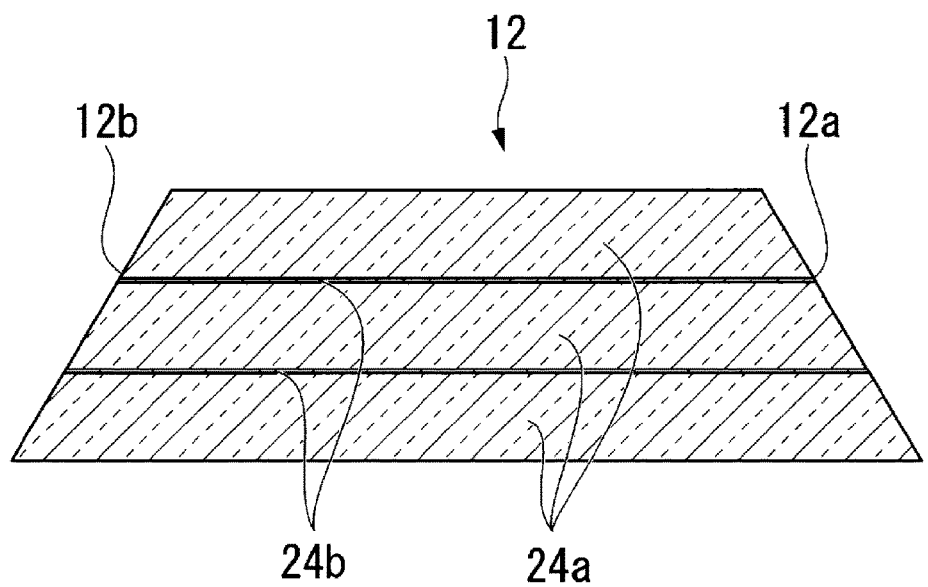
FIG. 5 is a sectional view illustrating a schematic configuration of a pupil expanding element.

FIG. 5 is a sectional view illustrating a schematic configuration of the pupil expanding element 12.

As illustrated in FIG. 5, the pupil expanding element 12 includes a plurality of parallel plane plates (light guiding material) 24a and a plurality of half mirrors 24b. The plurality of parallel plane plates 24a are bonded to each other through the half mirror 24b. The pupil expanding element 12 is cut such that a pair of end surfaces is inclined with respect to a thickness direction of the parallel plane plate 24a, and the end surfaces are respectively constitute a light entrance end surface 12a where the image light from the light scanning device 17 is incident, and a light exit end surface 12b where the image light is magnified and emitted. In this manner, a shape of a horizontal section of the pupil expanding element 12 is a trapezoidal shape.

In the pupil expanding element 12, the image light incident from the light entrance end surface 12a is repeatedly transmitted to and reflected by the plurality of half mirrors 24b, and then is emitted from the light exit end surface 12b. A width of the image light emitted from the light exit end surface 12b is magnified with respect to a width of the image light incident on the light entrance end surface 12a. In addition, an incident angle of the image light on the light entrance end surface 12a and an emission angle of the image light from the light exit end surface 12b are matched with each other.

Accordingly, for example, the image light which is vertically incident on the light entrance end surface 12a is vertically emitted from the light exit end surface 12b, and the image light which is incident on the light entrance end surface 12a at a predetermined incident angle is emitted from the light exit end surface 12b at an emission angle which is the same as the incident angle. Accordingly, in FIG. 3, when the image light is transmitted to the pupil expanding element 12, an optical path is bent to a short side of the trapezoidal shape.

Return to FIG. 3, the first light condensing optical system 13 is an optical system at least having positive power and negative power, and totally has the positive power. In the present embodiment, the first light condensing optical system 13 includes a first lens 21, a second lens 22, and a third lens 23 in order from a light incident side. Also, in the present embodiment, the first light condensing optical system 13 is configured with three lenses of the first lens 21, the second lens 22, and the third lens 23, but the number of correction lenses is not particularly limited.

Based on such a configuration, as illustrated in FIG. 4, since the first light condensing optical system 13 totally has the positive power, light emitted from the pupil expanding element 12 is condensed, and an intermediate image GM is formed in front of the second light condensing optical system 14.

The second light condensing optical system 14 forms the exit pupil H near pupils of eyes ME of the viewer M by condensing the light from the intermediate image, and a part of the external light is transmitted. The second light condensing optical system 14 is configured with a half mirror (concave mirror) having the positive power in a plane including the main frame 120 (refer to FIG. 3) and the eye ME of the viewer M.

The image light magnified by the pupil expanding element 12 is condensed by the first light condensing optical system 13, the intermediate image GM is formed in front of the second light condensing optical system 14, and the exit pupil H is formed near the pupil of the eye ME of the viewer M by reflecting the light from the second light condensing optical system 14. Since the second light condensing optical system 14 condenses the light from the intermediate image GM so as to return the light to be approximately parallel light, the viewer M can visually recognize the virtual image G1 in the distance.

Subsequently, the viewing angle expanding function in the HMD 300 of the present embodiment will be described. Hereinafter, the pupil expanding function in the plane (in-plane illustrated in FIG. 3) including the main frame 120 and the eye of the viewer M will be described.

Figure 6:
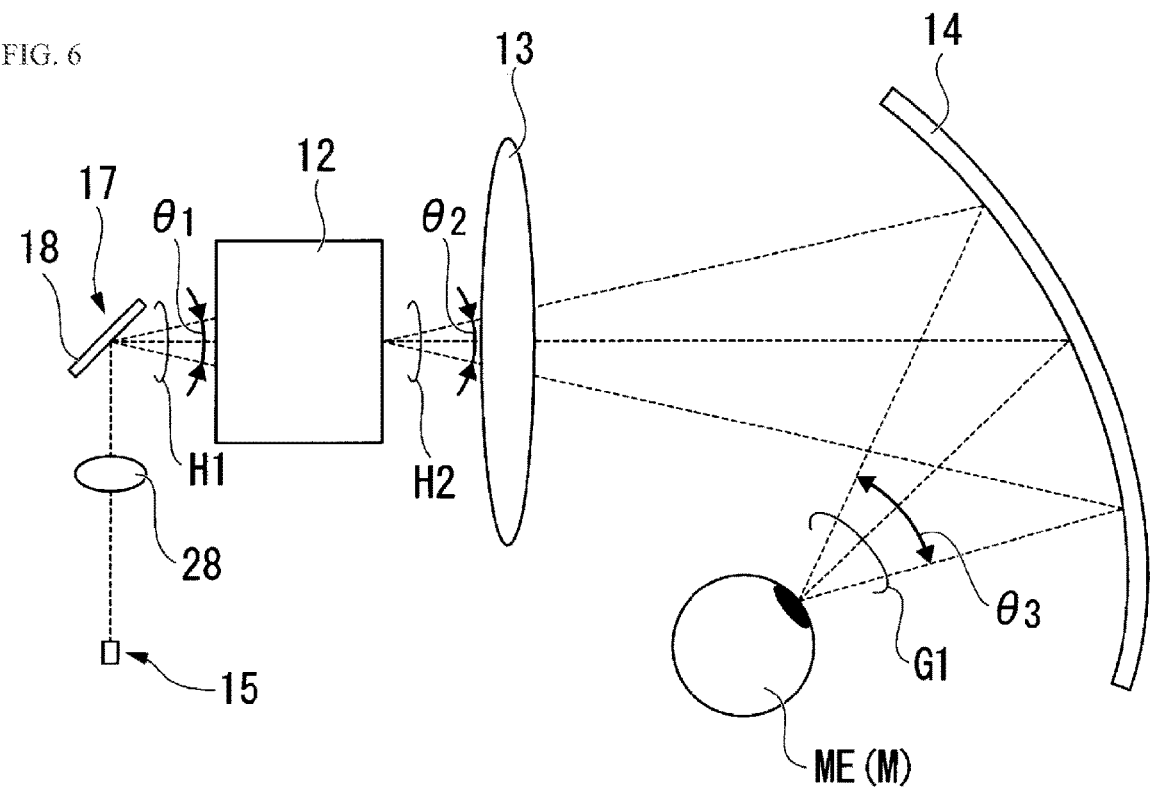
FIG. 6 is a view for describing a viewing angle expanding function.

FIG. 6 is a view for describing the viewing angle expanding function. Also, FIG. 6 only illustrates the center of the image (virtual image) and central light beams of both ends. In addition, in FIG. 6, the first light condensing optical system 13 is illustrated as one lens in order to easily see the system.

As illustrated in FIG. 6, the MEMS mirror 18 rotates so as to cause the first image light H1 to be incident on the pupil expanding element 12 at an angle $\theta_1$ of ±10 degrees. Here, the pupil expanding element 12 does not convert the angle of the first image light H1. Therefore, a maximum emission angle $\theta_2$ of the second image light H2 after being magnified in the pupil expanding element 12 becomes ±10 likewise.

In the present embodiment, the first light condensing optical system 13 and the second light condensing optical system 14 constitute an afocal optical system AF. An angular magnification B of the afocal optical system AF is defined as a value of which a substantial focal distance $F_1$ of the first light condensing optical system 13 illustrated in FIG. 5 is divided by a focal distance $F_2$ of the second light condensing optical system 14. Otherwise, as illustrated in FIG. 6, the angular magnification B can be also regulated by a ratio of the maximum emission angle $\theta_2$ of the first image light H1 and a maximum viewing angle $\theta_3$ of the virtual image G1.

The maximum viewing angle $\theta_3$ of the virtual image G1 is a value of which the angular magnification B is multiplied by the maximum emission angle $\theta_2$ of the second image light H2. Therefore, in order to obtain the viewing angle expanding function, the angular magnification B is necessary to be set to be greater than 1.

In the present embodiment, a lower limit value of the angular magnification B is set to 1.1. In a case in which the angular magnification B is set to 1.1 or more, for example, a viewing angle of 40 inches can be magnified up to a viewing angle of 44 inches or more.

Meanwhile, a magnitude R2 of the second image light H2 is magnified as the angular magnification B is magnified. Therefore, if the angular magnification B is greater than necessary, the pupil expanding element 12 also becomes great, and thus there is a concern that the entire apparatus including the pupil expanding element 12 increases in size.

For example, in order to secure the exit pupil H as 6.0 mm in a case in which the angular magnification B is set to 3.0 times, the magnitude R2 of the second image light H2 is required to be set to 18 mm. In order to realize that, a magnification ratio of the pupil expanding element 12 is required to be set to 18 times, and the pupil expanding element 12 significantly increases in size. Further, the first light condensing optical system 13 is required to be greater than 18 mm, and the HMD 300 increases in size.

In consideration of such a situation, there is an upper limit in the angular magnification B of which the viewing angle can be magnified with a miniaturized apparatus.

Substantially, the magnitude R2 of the second image light H2 (corresponding to exit port of pupil expanding element 12) is desirably approximately 10 mm. That is, if the magnitude R1 of the first image light H1 (corresponding to exit port of MEMS mirror 18) is 1 mm, the magnification ratio of the pupil expanding element 12 is set to 10 times.

Here, the magnification ratio of the pupil expanding element 12 is set, such that the magnitude R2 of the second image light H2 is equal to or greater than a size of which the angular magnification B is multiplied by a size (6 mm) of a predetermined exit pupil H.

Therefore, in a case in which the magnitude R2 of the second image light H2 is set to approximately 10 mm, an upper limit of the angular magnification B may be set to be equal to or less than 1.7 times.

Also, the substantial upper limit of the magnitude R2 of the second image light H2 after the apparatus configuration is miniaturized is set to approximately 15 mm. In this case, a pupil expanding ratio of the pupil expanding element 12 is set to 15 times, and an upper limit of the angular magnification B may be set to be equal to or lower than 2.5.

In consideration of such a background, in the present embodiment, the angular magnification B of the afocal optical system AF is set to be 1 or more and 2.5 or less, and more desirably, 1.1 or more and 1.7 or less.

Hereinafter, a case in which the angular magnification is set to 1.5 times will be described as an example. In this case, the maximum viewing angle $\theta_3$ of the virtual image G1 is ±15 degrees by multiplying the maximum emission angle $\theta_2$ of the second image light H2 by the angular magnification B. That is, the maximum viewing angle $\theta_3$ of the virtual image G1 is greater than the maximum emission angle $\theta_2$ of the first image light H1 of the image generating unit 11.

That is, in a case in which the angular magnification B is set to 1.0 times (case of not being changed from the maximum emission angle $\theta_2$ (±10 degrees) as it is), a virtual image of a size of approximately 40 inches 2.5 m ahead and an aspect 16:9 is obtained, but if the angular magnification B is set to 1.5 times, a virtual image of a size of approximately 60 inches 2.5 m ahead and an aspect 16:9 is obtained can be obtained.

That is, according to the HMD 300 of the present embodiment, the viewing angle expanding function for expanding the viewing angle of the virtual image G1 can be obtained. The magnitude R2 of the second image light H2 is reduced at a ratio of an inverse number (1/angular magnification B) of the angular magnification B (1.5 times). Therefore, the second image light H2 is approximately 6.6 mm at a position of the pupil of the viewer M. Accordingly, even when considering an influence due to aberration of an actual afocal optical system AF, approximately 6 mm size R3 of the exit pupil H can be secured.

As described above, in the HMD 300 of the present embodiment, the afocal optical system AF in which the angular magnification B is set to be 1 or more and 2.5 or less (more desirably 1.1 or more and 1.7 or less) is provided, and the magnitude R2 of the second image light H2 is set to be greater than the size R3 of the exit pupil H. Specifically, in the present embodiment, the size R1 of the first image light H1 is 1 mm (corresponding to diameter of MEMS mirror 18), the magnitude R2 of the second image light H2 is 10 mm, and the size R3 of the exit pupil H is 6 mm or more. In addition, the maximum emission angle $\theta_2$ of the first image light H1 is ±10 degrees, and the maximum viewing angle $\theta_3$ of the virtual image G1 is ±15 degrees.

According to the HMD 300 of the present embodiment, a size of the exit pupil H is set in consideration of reduction due to the magnified viewing angle of the virtual image G1. Therefore, even when a diameter of the pupil is reduced by expanding the viewing angle of the virtual image G1, a predetermined size (6 mm or more) of the exit pupil H can be obtained.

In addition, since the upper limit of the angular magnification B is regulated in the present embodiment, the pupil expanding element 12 does not increase in size, and the entire apparatus can be miniaturized.

Accordingly, the miniaturized HMD 300 in which both the pupil expanding function and the viewing angle expanding function are achieved is provided.

Second Embodiment

Subsequently, a second embodiment will be described. This embodiment and a first embodiment are different from each other in a point of a structure of the second light condensing optical system, but the others except the point are common to each other, and the same numeral is given to the common component and detailed description thereof will be omitted.

Figure 7:
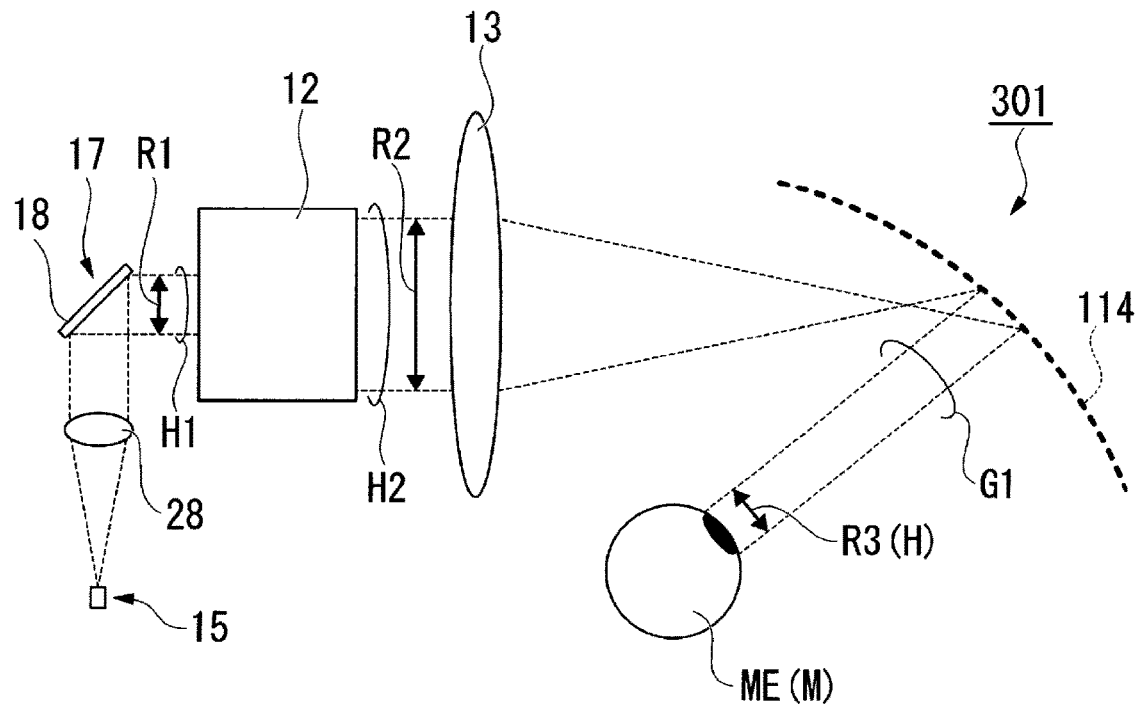
FIG. 7 is a view for describing a pupil expanding function in a HMD of a second embodiment.

FIG. 7 is a view for describing the pupil expanding function in a HMD 301 of the present embodiment. Also, a light flux of the center of an image (virtual image) is only illustrated in FIG. 7. In FIG. 7, the first light condensing optical system 13 is illustrated as one lens in order to easily see the system.

In the present embodiment, the second light condensing optical system 114 is configured with a reflective type hologram having a positive power in a plane including at least the main frame 120 (refer to FIG. 3) and the eye of the viewer M.

The second light condensing optical system 114 includes a volume hologram, and is capable of randomly adjusting an incident angle and a reflection angle of light by changing a volume hologram pattern.

The second light condensing optical system 114 is capable of expanding a section of the reflected light flux by making an incident angle and a reflection angle of the light. Accordingly, the second light condensing optical system 114 includes the pupil expanding function of expanding the second image light H2 at the time of reflecting the light from the intermediate image when compared a case in which the light is reflected from the second light condensing optical system 14 of the first embodiment.

In the present embodiment, when the size R3 of the exit pupil H (6 mm) same as the first embodiment is obtained, the magnitude R2 of the second image light H2 can be reduced approximately 8 mm as an effect of expanding pupil due to the hologram. Accordingly, as the second image light H2 is reduced, the pupil expanding element 12 and the first light condensing optical system 13 can be miniaturized, and thus the entire apparatus can be miniaturized.

In addition, according to the present embodiment, if the magnitude R2 of the second image light H2 is secured as a magnitude (10 mm), even when the angular magnification B increases, the exit pupil H having a sufficient size due to the effect of expanding pupil of the hologram can be obtained. Accordingly, a higher viewing angle of the virtual image G1 can be achieved.

Otherwise, if the magnitude R2 and the angular magnification B of the second image light H2 are not changed, the exit pupil H can be more magnified as the effect of expanding pupil of the hologram, and thus the HMD 301 can be provided which is excellent in general versatility and is capable of improving that people having various sizes of eyes easily see.

Also, a technical scope of the disclosure is not limited to the embodiments described above, and it is possible to add various modifications without departing from the gist of the disclosure.

Figure 8:
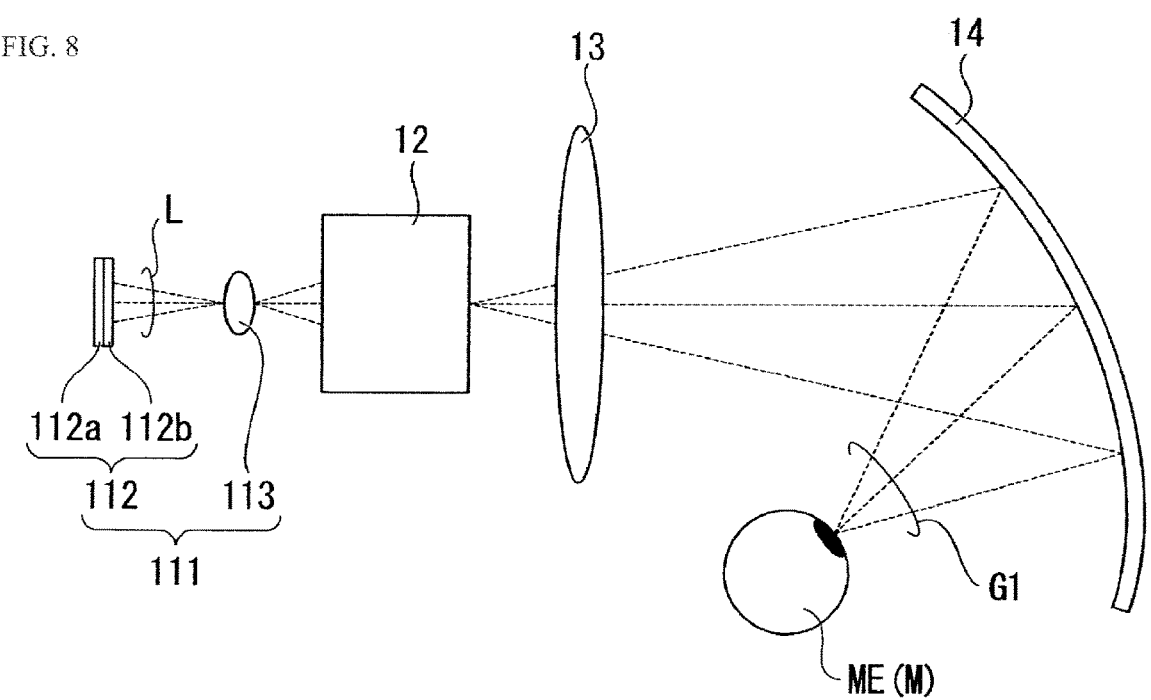
FIG. 8 is a view illustrating a configuration of an image generating unit according to a modification example.

For example, in the embodiment described above, a case in which the light scanning device 17 is used as the image generating unit 11 is exemplified, but the configuration of the image generating unit is not limited thereto. For example, as illustrated in FIG. 8, as an image generating unit 111, a display panel (electro-optical device) 112, and a device including a collimator lens 113 may be used.

The display panel 112 includes a backlight 112a and a light modulation element 112b. The backlight 112a is configured with, for example, a set of light sources of each of light emission color such as red, green, and blue. As each light source, for example, a light emitting diode (LED), a laser light source, or the like can be used. As the light modulation element 112b, for example, a liquid crystal display which is a display element or the like can be used. In addition, as the display panel 112, an organic electroluminescence device (organic EL device) or the like can also be adopted.

The collimator lens 113 is configured with, for example, a group of projection lens which are projects image light being incident, and projects the first image light L emitted from the light modulation element of the display panel 112 so that the light is light flux in a parallel state. The first image light L through the collimator lens 113 includes different angular components.

In addition, in the embodiment described above, a structure in which the plurality of parallel plane plates 24a and the plurality of half mirrors 24b are stacked is exemplified as the pupil expanding element 12, but the embodiment is not limited thereto. For example, a pupil expanding element may be formed using an optical element including a plurality of diffraction elements.

Figure 9:
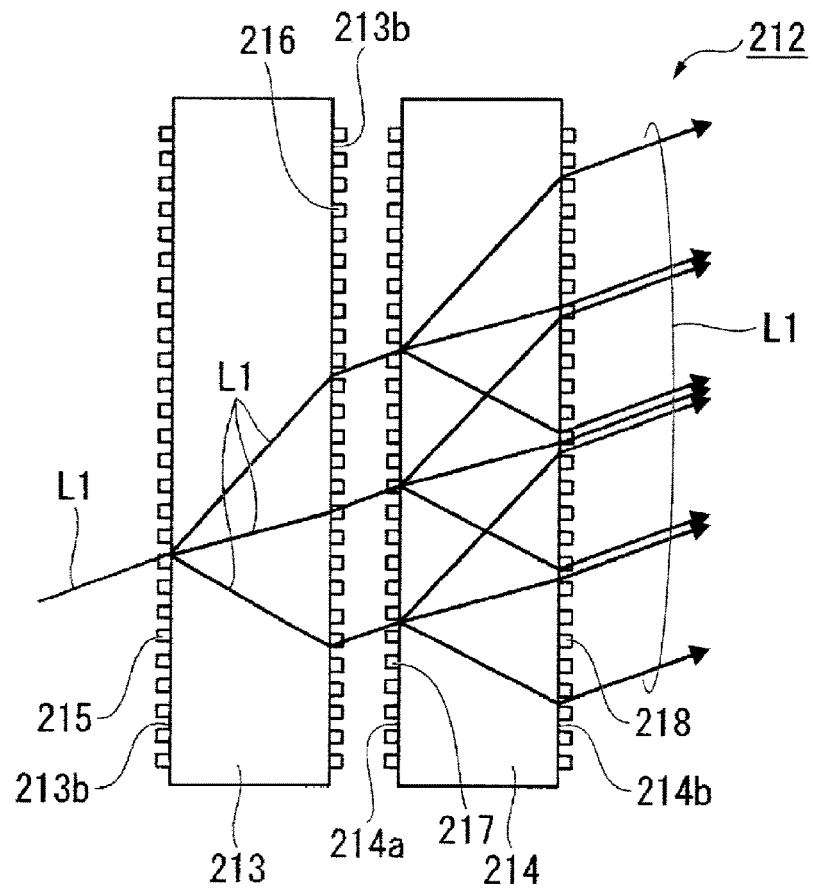
FIG. 9 is a view illustrating a configuration of a pupil expanding element according to the modification example.

For example, as illustrated in FIG. 9, a pupil expanding element 212 including a first optical element 213 and a second optical element 214 may be also used.

The first optical element 213 includes a light incident side diffraction portion (diffraction element) 215 disposed on a light incident surface side 213a side, and a light emission side diffraction portion (diffraction element) 216 disposed on a light emission surface side 213b side. The light incident side diffraction portion 215 and the light emission side diffraction portion 216 include grating patterns 215a and 216a in which a plurality of linear gratings are arranged.

The second optical element 214 includes a light incident side diffraction portion 217 disposed on the light incident surface side 214a side and a light emission side diffraction portion 218 disposed on the light emission surface side 214b side. The light incident side diffraction portion 217 and the light emission side diffraction portion 218 includes grating patterns 217a and 218a in which a plurality of linear gratings are arranged.

As illustrated in FIG. 9, a light flux of light L1 incident on the first optical element 213 increases to be three when being diffracted by the light incident side diffraction portion 215, is emitted from the light emission side diffraction portion 216, and is incident on the second optical element 214. The light flux of each light L1 incident on the second optical element 214 increases to be three when being diffracted by the light incident side diffraction portion 217 as same as above, and is emitted from the light emission side diffraction portion 218. According to such a pupil expanding element 212, the sectional area of the light is magnified by repeatedly diffracting the light such that the second image light can be generated.

For example, in the embodiment described above, a case in which both the pupil expanding function and the viewing angle expanding function are achieved in a plane including the main frame 120 (refer to FIG. 3) and the eye of the viewer M is described; however, the embodiment is not limited thereto. The embodiment can be applied for a case in which both the pupil expanding function and the viewing angle expanding function are achieved in a plane (plane perpendicular to plane of paper of FIG. 3) orthogonal to a plane including the main frame 120 and the eye of the viewer M.

REFERENCE SIGNS LIST

M viewer
ME eye
G1 virtual image
H exit pupil
H1 first image light
H2 second image light
L first image light
B angular magnification
MG intermediate image
$F_1$, $F_2$ focal distance
11, 111 image generating unit
12, 212 pupil expanding element
13 first light condensing optical system
14, 114 second light condensing optical system
17 light scanning device
24a parallel plane plate (light guiding material)
24b half mirror (half mirror layer)
25 light source unit
112 display panel (electro-optical device)
113 collimator lens
120 main frame (device main body)
213 first optical element
214 second optical element
215, 217 light incident side diffraction portion (diffraction element)
216, 218 light emission side diffraction portion (diffraction element)
300 HMD (image display device)

The invention claimed is:

1. An image display device comprising:
an image generating unit that emits first image light;
a pupil expanding element that expands a diameter of a light flux included in the first image light from the image generating unit to obtain second image light;
a first light condensing optical system that condenses the second image light and forms an intermediate image; and
a second light condensing optical system that condenses light from the intermediate image and generates a virtual image on an eye of a viewer,
wherein, in a plane including at least the image generating unit, the pupil expanding element, and the eye of the viewer,
a maximum emission angle of the first image light is smaller than a maximum viewing angle of the virtual image, and
the diameter of the light flux included in the second image light is greater than that of a light flux included in the virtual image.

2. The image display device according to claim 1,
wherein an angular magnification, which is defined as the maximum viewing angle of the virtual image with respect to the maximum emission angle of the first image light, is 1 or more and 2.5 or less.

3. The image display device according to claim 2,
wherein the angular magnification is 1.1 or more and 1.7 or less.

4. The image display device according to claim 2,
wherein a magnification ratio of the pupil expanding element is such that a diameter of the light flux included in the second image light is equal to or greater than a size obtained by multiplying a diameter of the light flux included in the virtual image by the angular magnification.

5. The image display device according to claim 1,
wherein an angular magnification, defined as a substantial focal distance of the first light condensing optical system is divided by a substantial focal distance of the second light condensing optical system, is 1 or more and 2.5 or less.

6. The image display device according to claim 5,
wherein the angular magnification is 1.1 or more and 1.7 or less.

7. The image display device according to claim 5,
wherein a magnification ratio of the pupil expanding element is such that a diameter of the light flux included in the second image light is equal to or greater than a size obtained by multiplying a diameter of the light flux included in the virtual image by the angular magnification.

8. The image display device according to claim 1,
wherein the image generating unit is a light scanning device which scans the light emitted from a light source unit to obtain the first image light.

9. The image display device according to claim 1,
wherein the image generating unit includes an electro-optical device and a collimator lens.

10. The image display device according to claim 1,
wherein the pupil expanding element is an optical element in which a plurality of light guiding materials are bonded to each other through a half mirror layer.

11. The image display device according to claim 1,
wherein the pupil expanding element is an optical element including a diffraction element.

12. The image display device according to claim 1,
wherein the first light condensing optical system is an optical system having at least positive power and negative power, and totally has the positive power.

13. The image display device according to claim 1,
wherein the second light condensing optical system is a concave mirror having the positive power in a plane including at least the image generating unit, the pupil expanding element, and the eye of the viewer.

14. The image display device according to claim 1,
wherein the second light condensing optical system is a reflective type hologram having the positive power in the plane including at least the image generating unit, the pupil expanding element, and the eye of the viewer.

15. The image display device according to claim 1, wherein
the pupil expanding element has a first surface and a second surface that is a surface opposite to the first surface,
the first surface is a surface in which the first image light enters,
the second surface is a surface that emits the second image light.

16. The image display device according to claim 15,
wherein an incident angle of the first image light to the first surface is the same as an emission angle of the second image light from the second surface.

* * * * *